(12) United States Patent
Maguire

(10) Patent No.: US 8,678,699 B2
(45) Date of Patent: Mar. 25, 2014

(54) CONNECTING ITEMS TO U-SHAPED FRAMES

(75) Inventor: Patrick David Maguire, Dunedin (NZ)

(73) Assignee: Thule IP AB, Malmo (SE)

( * ) Notice: Subject to any disclaimer, the term of this patent is extended or adjusted under 35 U.S.C. 154(b) by 0 days.

(21) Appl. No.: 13/390,792

(22) PCT Filed: Aug. 24, 2010

(86) PCT No.: PCT/NZ2010/000165
§ 371 (c)(1),
(2), (4) Date: May 1, 2012

(87) PCT Pub. No.: WO2011/025390
PCT Pub. Date: Mar. 3, 2011

(65) Prior Publication Data
US 2012/0275854 A1 Nov. 1, 2012

(30) Foreign Application Priority Data

Aug. 24, 2009 (NZ) ........................................ 579236

(51) Int. Cl.
*B62J 7/04* (2006.01)
(52) U.S. Cl.
USPC ......... 403/385; 280/288.4; 297/201; 224/431
(58) Field of Classification Search
USPC .......... 403/385, 389, 391; 297/195.1–215.16;
280/288.4; 224/42.4, 431, 547
See application file for complete search history.

(56) References Cited

U.S. PATENT DOCUMENTS

| 3,791,563 | A | | 2/1974 | Raat |
| 4,369,998 | A | * | 1/1983 | Blase .................. 297/215.16 |
| 5,228,796 | A | * | 7/1993 | Kao ........................ 403/84 |
| 5,676,420 | A | * | 10/1997 | Kuipers et al. .............. 297/204 |
| 5,749,622 | A | * | 5/1998 | Tseng ..................... 297/195.1 |
| 5,765,912 | A | * | 6/1998 | Bontrager .................. 297/214 |
| 6,322,139 | B1 | * | 11/2001 | Chuang ................... 297/195.1 |
| 6,347,804 | B1 | * | 2/2002 | Seibel .................... 280/288.4 |
| 6,402,236 | B1 | * | 6/2002 | Yates ...................... 297/201 |
| 6,443,344 | B1 | * | 9/2002 | Nicosia et al. ............... 224/413 |
| 7,275,787 | B1 | * | 10/2007 | Grove .................... 297/215.12 |
| 7,431,390 | B2 | * | 10/2008 | Martin et al. ................. 297/199 |
| 7,946,632 | B1 | * | 5/2011 | Mueller ....................... 292/1 |
| 8,205,774 | B2 | * | 6/2012 | Lin ....................... 224/427 |
| 2006/0119147 | A1 | * | 6/2006 | Nelson .................... 297/195.1 |
| 2009/0108643 | A1 | * | 4/2009 | Yu ......................... 297/214 |
| 2009/0145942 | A1 | | 6/2009 | Rice |
| 2011/0260510 | A1 | * | 10/2011 | Hsu ........................ 297/201 |

FOREIGN PATENT DOCUMENTS

WO WO 03/001 069 A1 1/2003

OTHER PUBLICATIONS

International Search Report prepared by the Australian Patent Office on Dec. 9, 2010, for International Application No. PCT/NZ2010/000165.

\* cited by examiner

*Primary Examiner* — Joshua Kennedy
(74) *Attorney, Agent, or Firm* — Sheridan Ross P.C.

(57) ABSTRACT

A connection system for connecting an item to a U-shaped frame member is provided. The system includes: at least two opposed toggle clamps for releasably engaging the arms of the U-shaped frame member; at least one toe which releasably engages the top bend of the U-shaped frame member; and wherein the toggle clamps and toe are connected to a base member which forms part of, or is attachable, to the item.

11 Claims, 6 Drawing Sheets

CONNECTING ITEMS TO U-SHAPED FRAMES

CROSS REFERENCE TO RELATED APPLICATIONS

This application is a national stage application under 35 U.S.C. 371 of PCT Application No. PCT/NZ2010/000165 having an international filing date of 24 Aug. 2010, which designated the United States, which PCT application claimed the benefit of New Zealand Application No. 579236 filed 24 Aug. 2009, the entire disclosure of each of which is incorporated herein by reference.

TECHNICAL FIELD

The present invention relates to improvements in and relating to connection systems. In particular the present invention relates to connection systems for attaching items to a frame member.

BACKGROUND ART

Various connection systems for connecting items to frame members exist.

However, most systems require fasteners and tools to attach an item to a frame member. Alternatively, the systems may require multi-step process to fasten or undo which can be time consuming and frustrating. In addition U-shaped members can also present difficulties in obtaining a connection because of their unique shape and the fact more than one attachment point is often required to obtain a secure connection between the item and U-shaped frame member.

It would therefore be useful to have a specific connection system which would enable an item to be quickly and securely connected to a U-shaped member as well as quickly released there from.

It would also be useful to have a connection system which could allow for an item to remain substantially in place, even when subject end, to forces in any one of the three dimensions (i.e. along the x, y or z axes).

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a connection system for connecting an item to a U-shaped frame member wherein the system includes:

at least two opposed toggle clamps for releasably engaging the arms of the U-shaped frame member;
at least one toe which releasably engages the top bend of the U-shaped frame member; and
wherein the toggle clamps and toe are connected to a base member which forms part of, or is attachable, to the item.

According to another aspect of the present invention there is provided an item which includes a connection system substantially as described above.

The item may be almost any item one wants to attach to a U-shaped frame member, including but not limited to:
panniers;
backpacks;
baskets;
baby seats; and
electronic devices.

In preferred embodiments the item may be a deck.

The U-shaped frame member may generally have, a tubular cross-section. However, this should not be seen as limiting as other cross-sectional profiles are envisaged.

The U-shaped frame member is preferably part of a framework configured for attaching to a bike.

The toggle clamps can be configured in a variety of different ways to releasably engage the U-shaped member.

In some embodiments the toggle clamps may have two opposed projections which:
create a mouth which has dimensions smaller than that of the diameter of the U-shaped member; but which:
have suitably curved or angled distal ends which can be displaced upon the U-shaped frame member being forced towards the mouth which:
then opens to receive the U-shaped frame member before closing to capture same.

In preferred embodiments the toggle clamps may be pivotable between an open and a closed orientation.

More preferably the toggle clamps may be caused to move to their closed configuration simply by moving the U-shaped frame member towards the clamp which closes after the U-shaped frame member has past the pivot point to rotate the toggle clamp past a resilient stop which after deformation resumes a stop position to prevent reverse rotation to open the toggle clamp to thereby capture the U-shaped frame member.

In such preferred embodiments the toggle clamps may also include a release button assembly wherein the release button is arranged, if depressed by a suitable force, to deform the stop to allow reverse rotation of the toggle clamp, back to the open the clamp.

The toe may come in a variety of different configurations.

In some embodiments the toe may be the form of at least one projection which is shaped to receive the bend of the U-shape, and to prevent forward or reverse movement of the item, with respect to the U-shaped member.

In preferred embodiments the toe may be made from a resilient material, and may have suitably curved or angled distal end(s) which can be displaced upon the U-shaped frame member being forced towards the toe, which then opens to receive the U-shaped frame member before closing to capture same.

In preferred embodiments the toe may be made from rubber or a resilient plastic.

In preferred embodiments the base member includes the deformable stop thereon.

In more preferred embodiments the base member is made from and at least partially resilient material.

Thus the present invention may have a number of advantages over the prior art which can include:

providing a connection system which can provide a snap fit attachment for quickly attaching or detaching an item to a U-shaped frame member;

providing a connection system which is able to retain the item securely affixed to the U-shaped frame member even when experiencing forces along any one of the x, y or z axes.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
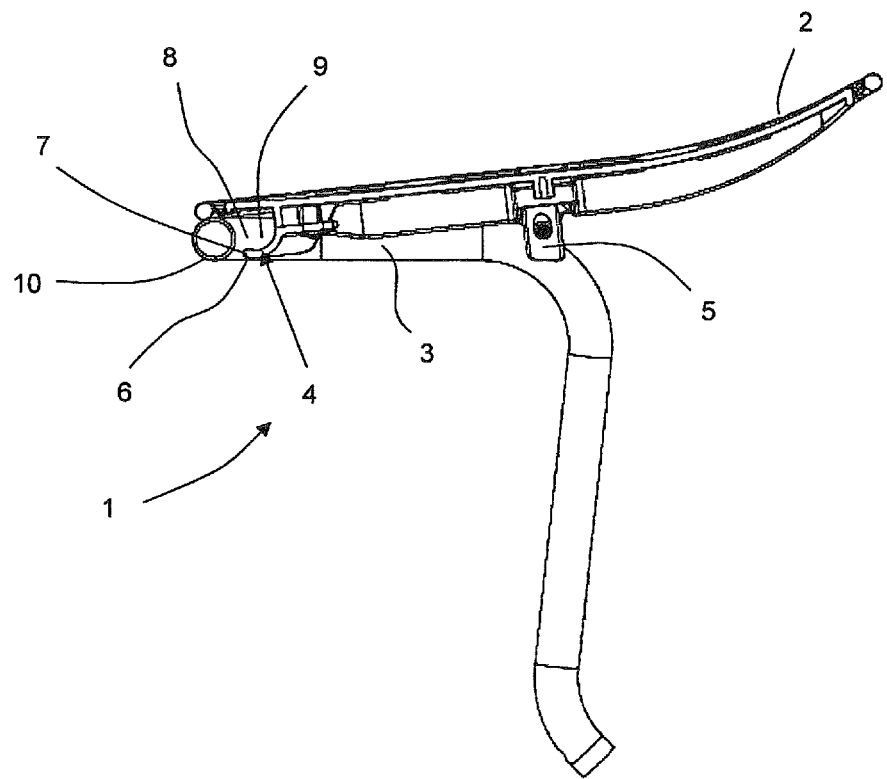
FIG. 1 is a cross sectional view through the longitudinal axis of the item in the form of a deck as it is about to be connected to a U-shaped frame member.
Figure 2:
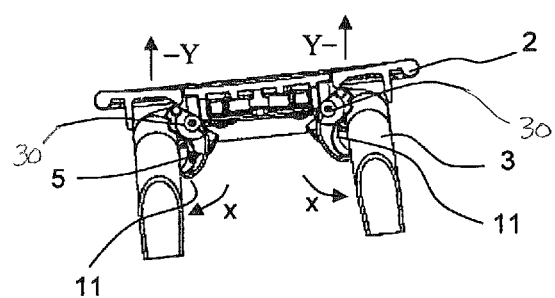
FIG. 2 is a transverse cross sectional view of FIG. 1.
Figure 3:
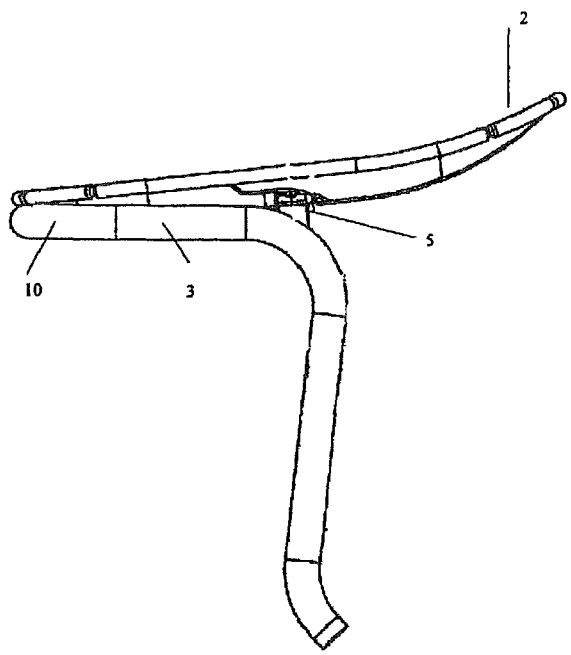
FIG. 3 is a side view of FIG. 1.
Figure 4:
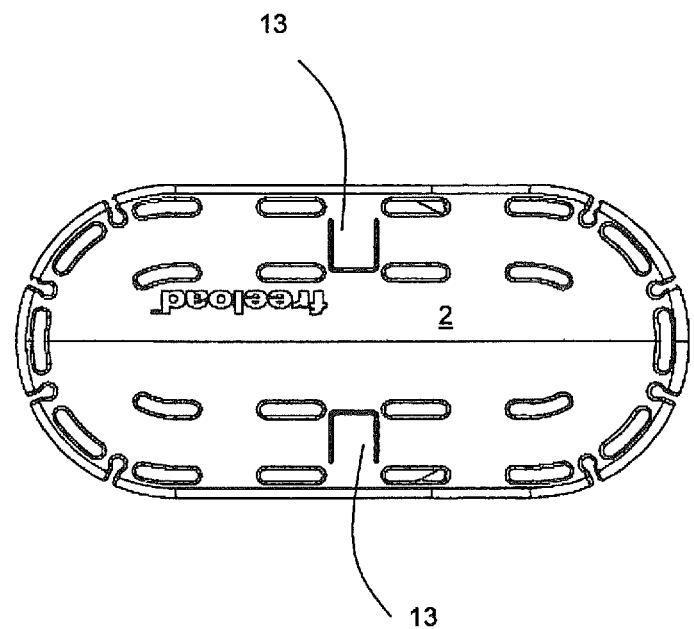
FIG. 4 is a top plan view of the deck of FIG. 1.

FIGS. 1-4 illustrate how the connection system 1 attaches an item in the form of a deck 2 to a U-shaped frame member in the form of a bicycle carrier frame 3.

The connection system has a toe 4 near one end of the deck 2 and two opposed toggle clamps 5 on either side of the deck 2. The toe 4 has a curved distal end 6 which has a rounded nose 7 which creates a mouth 8 of a recess 9 into which the bend 10 of the U-shaped frame member 3 fits. The dimensions of the mouth 8 are slightly smaller than the diameter of the U-shaped frame member 3 such that the mouth 8 has to deform outwardly to receive the U-shaped frame member 3. Once received in recess 9 the toe 4 returns to its original position.

The toggle clamps 5 pivot about a spindle 30 in direction of arrow X as the U-shaped frame member 3 is moved towards the deck 2. The toggle clamps 5 have a curved distal end 11 which retains the U-shaped member 3 once it has rotated about spindle 30. The proximate end of toggle clamps 5 have a heel 12 which abuts a stop 13 on the deck 2. The stop 13 is a section of the deck 2 which can flex in the direction of arrow Y to allow for rotation of the toggle clamp 5 before returning to its original non-flexed position which is flush with the rest of the top surface 14 of the deck 3.

Figure 5:
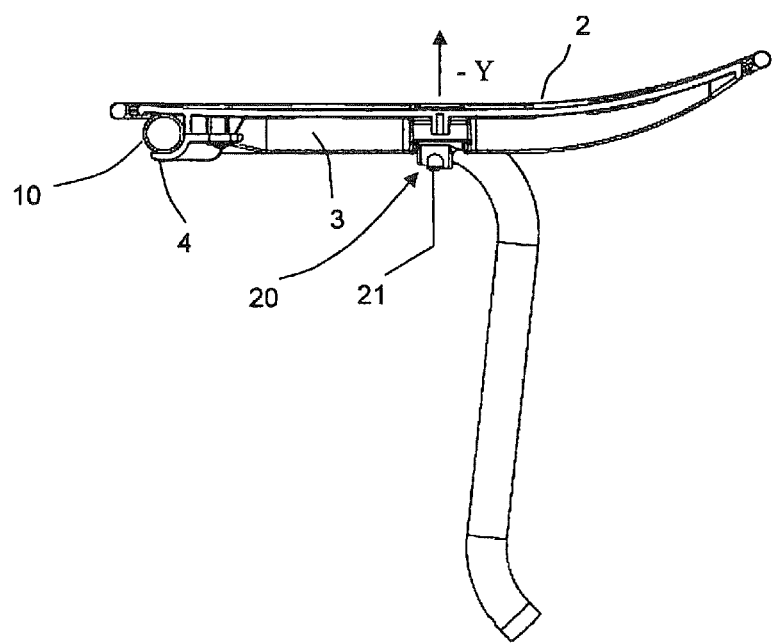
FIG. 5 is a cross sectional view through the longitudinal axis of the item in the, form of a deck connected to a U-shaped frame member.
Figure 6:
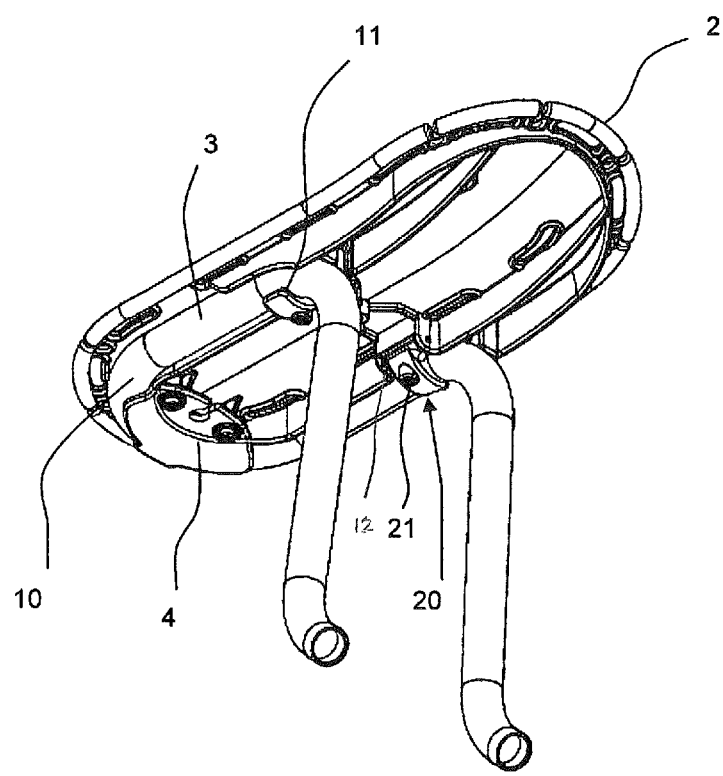
FIG. 6 is a perspective view of the underside of a deck connected to a U-shaped frame member.

FIGS. 5 and 6 show the deck 2 connected via toe 4 and toggle clamps 5 to the U-shaped frame member 4. The deck 2 is released from the U-shaped member 3 via a release button assembly generally indicated by arrow 20. The release button assembly has a release pin 21 located within an aperture (not shown) in the toggle clamp 5 and retained therein by the spindle 30. The release pin 21 has a recess on its surface (not shown) which allows the spindle to pass between the pin 21 and surface of the aperture. The length of the recess along the pin is sufficient to allow the pin to move along its longitudinal axis a set distance when depressed which can move stop 13 in direction Y to release the heel 12 and allow the toggle 5 to rotate back to its open position—refer FIG. 2. Thus, detachment of the deck 3 from the U-shaped member is a simple one step push of a button.

Aspects of the present invention have been described by way of example only and it should be appreciated that modifications and additions may be made thereto without departing from the scope of the appended claims.

I claim:

1. A connection system comprising:
   a U-shaped frame member having elongate arms;
   an items selectively attachable with the U-shaped frame member;
   the items comprising a base member, the base member comprising at least two opposed toggle clamps for releasably engaging the elongate arms of the U-shaped frame member, at least two corresponding resilient stops, each comprising a section of the item which can flex to allow for rotation of the toggle clamps and which is flush with a top surface of the item in a non-flexed position and at least one toe with a curved distal end shaped to receive an interior of a bend of the U-shaped member, and to prevent forward or reverse movement of the item with respect to the U-shaped member, which releasably engages the bend of the U-shaped frame member,
   wherein the item is provided on a first side of the U-shaped frame member and the toe contacts a second opposing side of the U-shaped frame member
   wherein each of the toggle clamps are rotatable between an open configuration in which a toggle clamp is rotated against a corresponding resilient stop and a closed configuration in which the U-shaped frame member has passed a predetermined point of rotation of the toggle clamp against the resilient stop by moving the U-shaped frame member towards the toggle clamp; and
   wherein after a deformation of the resilient stops, the at least two toggle clamps resume a stop position to prevent reverse rotation and thereby capture the U-shaped frame member.

2. The connection system of claim 1, wherein the U-shaped frame member comprises a part of a framework configured for attaching to a bicycle.

3. The connection system of claim 2, wherein the toggle clamps have two opposed projections which:
   create a mouth which has dimensions smaller than that of the diameter of the U-shaped member;
   have suitably curved or angled distal ends which can be displaced upon the U-shaped frame member being forced towards the mouth, wherein the mount opens to receive a portion of the U-shaped frame member before closing to capture same.

4. The connection system of claim 2, wherein each of the toggle clamps further comprise a release button wherein the release button is adapted to deform a corresponding resilient stop to allow reverse rotation of the toggle clamp.

5. The connection system of claim 2, wherein the toe may be the form of at least one projection which is shaped to receive the bend of the U-shaped member, and to prevent forward or reverse movement of the item with respect to the U-shaped member.

6. The connection system of claim 2, wherein the toe comprises a resilient material and suitably curved or angled distal end(s) which can be displaced upon the U-shaped frame member being forced towards the toe, which then opens to receive the U-shaped frame member before closing to capture same.

7. The connection system of claim 1 wherein the toggle clamps have two opposed projections which:
   create a mouth which has dimensions smaller than that of the diameter of the U-shaped member;

have suitably curved or angled distal ends which can be displaced upon the U-shaped frame member being forced towards the mouth, wherein the mouth opens to receive a portion of the U-shaped frame member before closing to capture same.

8. The connection system of claim 1 wherein each of the toggle clamps further comprise a release button assembly wherein the release button assembly is arranged, if depressed by a suitable force, to deform the a corresponding resilient stop to allow reverse rotation of the toggle clamp.

9. The connection system of claim 1 wherein the toe comprises at least one projection which is shaped to receive the bend of the U-shaped member, and to prevent forward or reverse movement of the item with respect to the U-shaped member.

10. The connection system of claim 1 wherein the toe comprises a resilient material and suitably curved or angled distal end(s) which can be displaced upon the U-shaped frame member being forced towards the toe, which then opens to receive the U-shaped frame member before closing to capture same.

11. The connection system of claim 1, wherein the item is a deck for a bicycle carrier frame.

\* \* \* \* \*